United States Patent [19]

Alessio et al.

[11] 4,355,251

[45] Oct. 19, 1982

[54] TACHOMETRIC GENERATOR

[75] Inventors: Lorenzo E. Alessio, Lecco; Giuseppe Cuneo, Caloiziocorte, both of Italy

[73] Assignee: Black & Decker Inc., Newark, Del.

[21] Appl. No.: 160,733

[22] Filed: Jun. 18, 1980

[30] Foreign Application Priority Data

Jun. 28, 1979 [IT] Italy .............................. 23953 A/79

[51] Int. Cl.$^3$ ......................................... H02K 21/38
[52] U.S. Cl. .................................... 310/155; 310/168
[58] Field of Search ........................ 310/155, 168, 152

[56] References Cited

U.S. PATENT DOCUMENTS

| | | | |
|---|---|---|---|
| 2,462,761 | 2/1949 | Momberg | 310/168 X |
| 3,495,112 | 2/1970 | Kurakin. | |
| 3,619,678 | 11/1971 | Ruof. | |
| 3,735,262 | 5/1973 | Orth. | |
| 3,947,711 | 3/1976 | Presley et al. | 310/155 |
| 3,967,200 | 6/1976 | Tetsugu et al. | 329/173 |
| 3,970,935 | 7/1976 | Beery et al. | 324/166 |

FOREIGN PATENT DOCUMENTS

| | | |
|---|---|---|
| 1929097 | 12/1965 | Fed. Rep. of Germany. |
| 2748502 | 5/1979 | Fed. Rep. of Germany. |
| 2188347 | 1/1974 | France. |
| 2396302 | 1/1979 | France. |

Primary Examiner—Donovan F. Duggan
Attorney, Agent, or Firm—Walter Ottesen; Edward D. Murphy; Harold Weinstein

[57] ABSTRACT

Several embodiments of tachometers generators for use in controlling the speed of electrical motor driven tools. In each embodiment a toothed rotor (28, 52, 72, 92, 122) is fixed for rotation with the motor armature shaft (23, 53, 73, 93, 124) and a sensor (31, 55, 75, 96, 126) is juxtaposed to the rotor. The sensor is comprised of a core (32, 56, 76, 98, 127) having a first end portion (33, 57, 77, 99, 128) juxtaposed at a first location relative to the rotor and a second end portion (36, 58, 78, 101, 129) that is juxtaposed to the rotor at a second, spaced location. A permanent magnet (37, 59, 79, 102, 131) is interposed between the second end portion and the rotor with one of its poles aligned with a second end portion and the other of its poles aligned with the rotor. A coil (38, 61, 81, 103, 132) is wound around an intermediate portion (34, 62, 82, adjacent 99, adjacent 128) of the core so that a voltage will be generated in the coil by the alternating magnetic flux passing through the core during rotation of the rotor, which voltage is indicative of the speed of the armature shaft. The compact construction facilitates installation in close places and the device provides a strong signal and exhibits a high signal to noise ratio.

7 Claims, 15 Drawing Figures

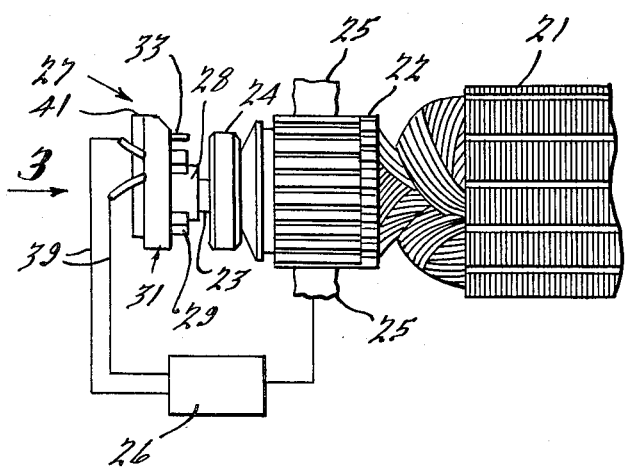
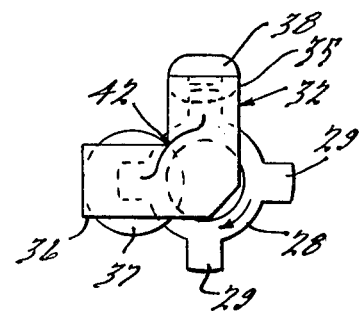
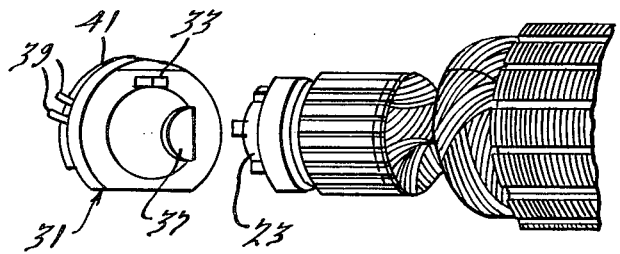
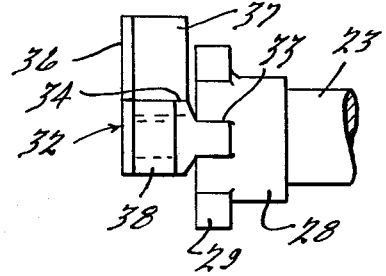
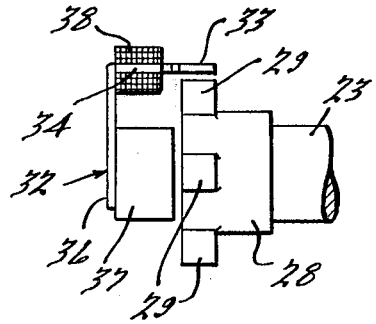
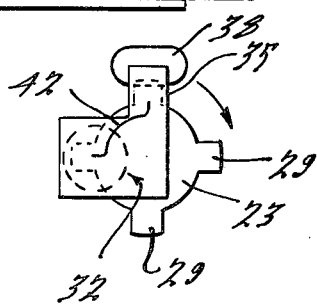
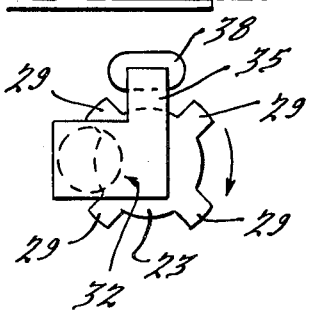

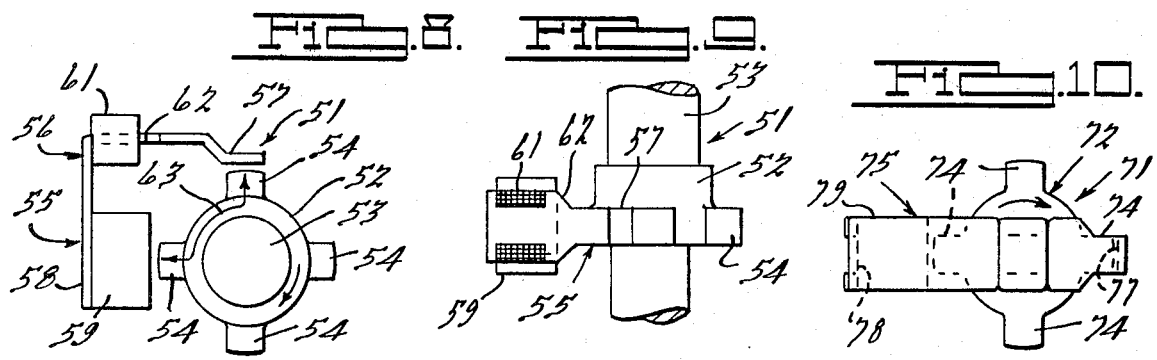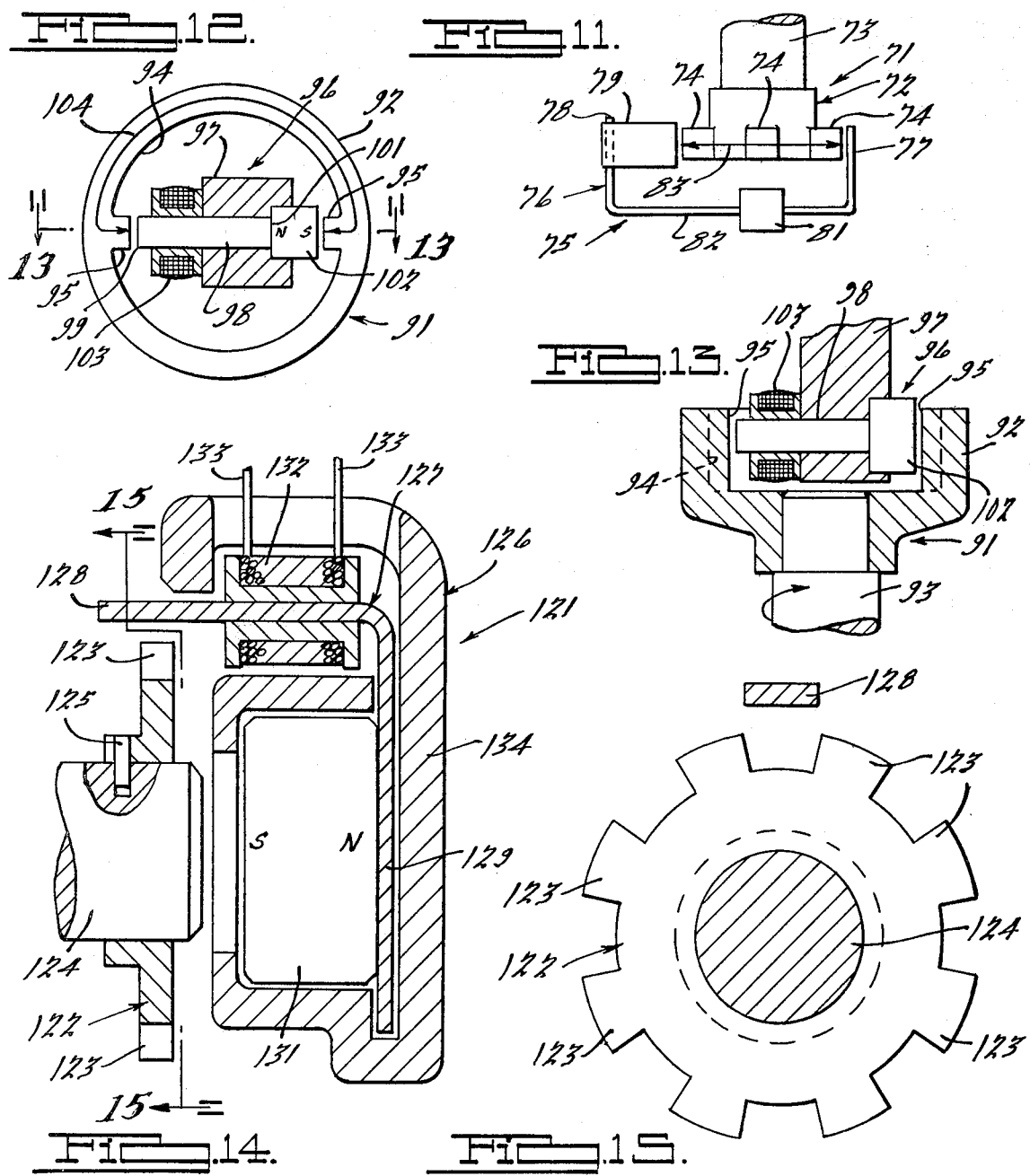

TACHOMETRIC GENERATOR

BACKGROUND AND SUMMARY OF THE INVENTION

The present invention relates to portable, electric motor driven tools, more particularly to an improved arrangement for controlling the speed of such tools.

It is common with variable speed, electric motor driven tools to provide some form of speed sensing device which senses the rotational speed of the armature and which, through a suitable control circuit, controls the speed of the motor to the preset value. One difficulty in conjunction with providing a satisfactory speed control circuit is the noise which is inherent in the brush and commutator of the motor and the fact that the tachometer must be relatively small in size so as to fit in the power tool. Such a tachometer must be low in cost and at the same time provide a high signal to noise ratio.

Many forms of tachometer generators used for this purpose comprise a rotor wheel that is provided with alternately polarized areas along its face and which rotates relative to a stationary magnetic core and sensing coil. Because the poles are disposed closely adjacent in each, the rotor with this type of device generally demagnetizes itself and thus the entire generator becomes inoperative. Also, in conjunction with most sensors of this type, the presence of the magnetized stator of the motor causes stray fluxes which generate noise signals and adversely affect the performance of the speed sensing device.

It is, therefore, one object of this invention to provide an improved, simplified and compact tachometer generator for controlling the speed of the electric motor of a power tool.

It is another object of this invention to provide an improved tachometer generator for such an arrangement in which the tachometer generator has a long life and provides a good signal to noise ratio. In conjunction with this, it is also an object to provide a tachometer generator that gives an extremely large output signal for its size.

Briefly, the invention disclosed herein is usable in conjunction with a power tool that has a housing, a speed control circuit for adjusting the speed of the tool motor, and a tachometer generator for supplying an electric signal to the speed control circuit indicative of the actual rotational speed of the tool. The tachometer generator includes a rotor member made of a magneticly permeable material having a central portion in a plurality of teeth extending from the central portion. A sensor member made of a magnetizable material and having first and second end portions and an intermediate portion is disposed with its first end portion at a first location adjacent to teeth of the rotor and its second end portion being disposed adjacent the rotor at a second location which is spaced from the first location. A magnet having opposite poles is also provided. Means fix one of the members for rotation with the output of the motor and the other member against rotation relative to housing for relative rotation of the members upon operation of the tool. In accordance with the invention, the magnet is fixably mounted at one of the two locations so as to be interposed directly between the rotor and the one of the end portions of the stationary member with one of its poles being directed toward the rotor and the other of its poles being directed toward the one end portion whereby a series magnetic circuit is formed which comprises the rotor, a stationary member and the magnet. A coil is disposed about the intermediate portion so as to be responsive to changes in the intensity of the flux passing through the magnetic circuit as the rotor rotates past the two locations.

Other objects and advantages of the present invention will become apparent from the detailed description of the preferred embodiments which makes reference to the following set of drawings in which:

BRIEF DESCRIPTION OF THE DRAWINGS

FIG. 1 is a partially schematic, elevational view of a preferred embodiment of the invention showing the tachometer generator associated with the armature of an electric motor for a power tool.

FIG. 2 is a partially exploded, perspective view of the embodiment shown in FIG. 2.

FIG. 3 is an end elevational view of the tachometer generator looking generally in the direction of the arrow 3 in FIG. 1.

FIG. 4 is a top plan view of the portion of the tachometer generator shown in FIG. 3.

FIG. 5 is a side elevational view of the tachometer generator.

FIG. 6 is a view, in part similar to FIG. 3, and illustrates the components in one position during their cycle of operation.

FIG. 7 is a view, in part similar to FIG. 6, showing the parts in another location.

FIG. 8 is an end elevational view, in part similar to FIG. 3, showing another embodiment of the invention.

FIG. 9 is a top plan view of the embodiment of FIG. 8.

FIG. 10 is an end elevational view, in part similar to FIGS. 3 and 8, and shows a further embodiment of the invention.

FIG. 11 is a top plan view of the embodiment shown in FIG. 10.

FIG. 12 is an end elevational view, in part similar to FIGS. 3, 8 and 10, with portions shown in section showing a still further embodiment of the invention.

FIG. 13 is a cross-sectional view of the embodiment shown in FIG. 12, taken along the line 13—13 thereof.

FIG. 14 is a side elevational view of still a further embodiment of the invention.

FIG. 15 is a cross-sectional view taken along the line 15—15 of FIG. 14.

DETAILED DESCRIPTION OF THE PREFERRED EMBODIMENTS

Embodiment of FIGS. 1 through 7

This invention is adapted to be embodied in conjunction with the motor control circuit for controlling the speed of the electric motor of a portable power tool. Inasmuch as the invention resides in the speed control circuit and specifically the tachometer generator thereof, only those portions of the motor and tool which are necessary to understand the invention have been illustrated.

The motor includes an armature 21 having a winding that is connected to a commutator 22 in a known manner. The armature 21 is carried by an armature shaft 23 which is journaled in the tool housing (not shown) in any suitable manner including a bearing 24. Brushes, indicated schematically at 25, provide the electrical current to the windings of the armature 22 in a known manner from a power source and speed controller, indicated schematically at 26. The speed controller 26 may be of any known construction and includes a device for permitting the operator to select the speed at which the motor will run.

The speed of the motor is measured by means of a tachometer generator, indicated generally by the reference numeral 27. The tachometer generator 27 includes a rotor 28 which is formed of a suitable magnetically permeable material such as sintered steel and has four poles or teeth 29. Because the wheel 28 is affixed to the armature shaft 23, it will rotate at the same speed as the armature shaft.

The tachometer generator also includes a sensor, indicated generally by the reference numeral 31. The sensor 31 is adapted to be fixed in any suitable manner relative to the housing of the tool and in proximity to the rotor wheel 28. The sensor 31 is comprised of a magnetically permeable member, indicated generally by the reference numeral 32 and shown in most detail in schematic FIGS. 3 through 7, which has a first end portion 33 that extends in a generally axial direction relative to the armature shaft 23 and which is disposed radially outwardly and adjacent the teeth 29 of the rotor 28 with a small air gap there between. The end portion 33 preferably has a width approximately equal to the width of the teeth 29.

The end portion 33 is connected to an intermediate leg portion 34 which also extends axially and which is connected at its opposite end to a radially extending leg 35. The leg 35 has a generally L-shape consisting of parts which are disposed at 90° relative to each other. One of these parts terminates at an end portion 36 that extends radially outwardly at 90° to the end portion 33 and is disposed in axial alignment with the teeth 29.

A permanent magnet, indicated by the reference numeral 37, is affixed to the end part 36 and is disposed with axially aligned poles. One of these poles is juxtaposed to the end portion 36 and other, opposite pole, is juxtaposed to the rear face of the rotor 28 adjacent the teeth 29.

A sensing coil 38 is wound around the intermediate portion 34 of the member 32 adjacent to its end portion 33. Leads 39 from the coil 38 extend to the control circuit 26 to provide a signal which is indicative of the speed of rotation of the armature shaft 29 as will become apparent.

Preferably the entire sensor assembly 31, except for the pole of the magnet 37 adjacent to teeth 29 and the end portion 33 is encased in a protective covering of plastic, as indicated by the reference numeral 41 in FIGS. 1 and 2. This protective coating has been eliminated in the schematic views, FIGS. 3 through 7, so as to more clearly show the construction of the sensor 31.

In operation the rotor 28 will rotate relative to the sensor 31 as the tool is in use. FIGS. 3 and 6 show the components in a first angular position when an adjacent pair of the teeth 29 of the rotor 28 are aligned respectively with the end portion 33 of the member 32 and one of the poles of the magnet 37. A magnetic flux path is then provided as shown in the solid line 42 in FIGS. 3 and 6. This is a low reluctance path which passes through the intermediate portion 34 that then forms a core of the winding of the coil 38. As the rotor 28 continues to rotate from the position in FIG. 6 toward the position shown in FIG. 7, the reluctance of this flux path will increase as the teeth 29 move away from the end portion 33 and the pole of the magnet 37 to cause a decreasing magnetic flux through the core of winding 38. Upon continued rotation from the position shown in FIG. 6, the reluctance will decrease and the magnetic flux will increase. Thus, a continually changing flux through the member intermediate portion 34 and coil 38 occurs which provides an electrical output voltage in the leads 39. The magnitude of this signal is related directly to the speed of rotation of the armature shaft 23 and, accordingly, that of the motor and associated tool. The speed sensing device 27 will, therefore, operate to provide a speed signal in the form of a voltage to the control device 26 so that the speed of the armature 21 may be controlled. The use of the four teeth 29 as shown and the close proximity of the permanent magnet 37 to one of these teeth creates a very strong signal and an extremely good signal to noise ratio for this device.

The Embodiment of FIGS. 8 and 9

A tachometer generator constructed in accordance with another embodiment of this invention is illustrated in FIGS. 8 and 9 and is identified generally by the reference numeral 51. Since the associated motor assembly and tool of the embodiment of FIGS. 8 and 9 is the same as the embodiment of FIGS. 1 through 7, these portion of the construction have not been illustrated. A rotor 52 is affixed to the armature shaft 53 in any known manner and has four radially extending teeth 54. As in the previously described embodiment, the rotor 53 is constructed of any suitable material that is magnetically permeable, such as a sintered steel.

A sensor, indicated generally by the reference numeral 55, is fixed relative to the tool housing in any suitable manner in proximity to the rotor 52. The sensor 54 has a generally L-shaped magnetically permeable core 56 with a first end portion 57 that is adapted to be juxtaposed to the outer periphery of the rotor teeth 54. A second end portion 58 of the core 56 is disposed at approximately a 90° angle to the end portion 57 and is also adapted to be juxtaposed to the teeth 54, but at a greater distance therefrom. A permanent magnet 59 is interposed between the end portion 58 and the teeth 54 with its respective poles in proximity with these two components.

A sensing coil 61 is wound around an intermediate portion 62 of the core 56 adjacent the end portion 57. As in the preceding embodiment, the coil 61 has its winding leads (not shown) connected to an appropriate motor control circuit for controlling the speed of the associated electric motor of the tool.

As the preceding embodiment, as the rotor 52 rotates relative to the sensor 55 a varying magnetic flux will pass through the core 56 and induce a voltage in the coil 61 which will vary in direct proportion to the speed of the armature shaft 53. The magnetic flux follows a path, indicated by the line 63 in FIG. 8 which varies from maximum when the end portion 57 and appropriate pole of the magnet 59 are directly aligned with the teeth 54 and a minimum when the armature shaft 53 is displaced 45° from the position shown in this Figure.

The Embodiment of FIGS. 10 and 11

FIGS. 10 and 11 illustrate a still further embodiment otachometer generator is indicated generally by the reference numeral 71. As with the embodiment of FIGS. 8 and 9, only those portions which differ from the preceding embodiments have been illustrated and will be described. The tachometer generator 71 consists of a rotor 72 that is affixed for rotation in any suitable manner with the armature shaft 73. The rotor 72 is provided with four radially extending teeth 74 and is formed from a suitable magnetically permeable material such as sintered steel.

A sensor assembly, indicated generally by the reference numeral 75 is supported by the tool housing against rotation and in juxtaposition to the rotor 72. The sensor 75 consists of generally U-shaped magnetically permeable core 76 having a first end portion 77 that is positioned radially outwardly of the rotor 72 and in juxtaposition to its teeth 74. A second end portion 78 of the core 76 is also positioned radially outwardly of the rotor 72 in juxtaposition to the teeth 74 but is spaced outwardly a greater distance therefrom. A permanent magnet 79 is interposed between the core end portion 78 and the periphery of the teeth 74 with one of its poles aligned with the teeth 74 and the other pole aligned with the end portion 78.

A sensing coil 81 encircles an intermediate portion 82 of the core 76 and has coil leads (not shown) which are connected to the appropriate motor control device.

As with the preceding embodiments, as the rotor 72 rotates with the armature shaft 73, an alternating magnetic flux will exist in the core 76 which induces a voltage in the coil 81 that is directly related to the speed of the armature shaft 73 to provide the necessary signal for motor speed control. The magnetic flux is a maximum when the teeth 74 are aligned with the pole of the magnet 79 and the core end 77, as indicated by the solid line flux path 83 in FIG. 11. This flux reaches a minimum when the rotor 72 has rotated through 45° from the position shown in the figures.

Embodiment of FIGS. 12 and 13

A tachometer generator constructed in accordance with a still further embodiment of this invention is illustrated in FIGS. 12 and 13 and is identified generally by the reference numeral 91. The tachometer generator 91 in connection with this embodiment comprises an annular rotor 92 of magnetically permeable material that is affixed in any suitable manner for rotation with an armature shaft 93. The rotor 92 is formed with a generally cylindrically shaped opening 94 into which radially inwardly extending teeth 95 are formed. In this embodiment, two teeth 95 are employed.

A sensor assembly, indicated generally by the reference numeral 96, is supported in any suitable manner by the motor housing and extends into the bore 94 of the rotor 92. The sensor 96 may be supported on a post 97 which is formed from a material that has a relatively high magnetic reluctance.

The sensor 96 includes a core 98 that extends diametrically across the bore 94 and which is formed any suitable magnetically permeable material. A first end portion 99 of the core 98 is juxtaposed to the teeth 95 and a second end portion 101 of the core 98 is also justaposed to the teeth but is spaced radially inwardly a greater distance therefrom. A permanent magnet 102 is interposed between the core end 101 and the teeth 95 with its respective poles aligned with these two elements, as in the preceding embodiments.

A sensing coil 103 encircles an intermediate portion of the core adjacent the end portion 99 and has its leads connected, as with the preceding embodiments, to the appropriate motor control circuit.

As the rotor 92 rotates relative to the sensor 96, an alternating magnetic flux will exist through the core 98 and through the rotor 92, which reaches its maximum when the teeth 95 are aligned with the core end 99 and magnet 102. A portion of this flux path is indicated by the solid line 104 in FIG. 12. This flux will be at a minimum when the rotor 92 is displaced 90° from the position shown in FIG. 12. As with the preceding embodiments, this alternating flux through the core 98 will cause a voltage to exist in the coil 101 which is directly related to the speed of the armature shaft 93.

Embodiment of FIGS. 14 and 15

A yet further embodiment of this invention is illustrated in FIGS. 14 and 15 wherein the tachometer generator is indicated generally by the reference numeral 121. The tachometer generator 121, as in the preceding embodiments, is comprised of a rotor 122 that is formed from a suitable magnetically permeable material such as sintered steel and which has radially outwardly extending teeth 123. The rotor 122 is affixed for rotation with the armature shaft 124 in any suitable manner, as by means including a pin 125.

A sensor assembly, indicated generally by the reference numeral 126, is affixed to the motor housing in proximity to the rotor 122. The sensor 126 includes a core piece 127 which is also formed from a suitable magnetically permeable material and which, in this embodiment has a generally L-shape. A first end 128 of the core piece 127 is disposed radially outwardly of the teeth 123 and have a width which is approximately equal to the width of the teeth 123. A second end portion 129 of the core piece 127 is aligned axially with the armature shaft 124. A permanent magnet indicated generally by the reference numeral 131, is positioned with one of its poles aligned with the end of the armature shaft 124 and the other of its poles in engagement with the core end 129. Thus, in this embodiment the armature shaft itself forms a portion of the flux path.

A sensing coil 132 is wound around an intermediate portion of the core 127 and specifically adjacent to the end 128. Leads 133 extend from the sensing coil 132 to the appropriate motor control circuit. An insulating nonmagnetically permeable material 134 encircles the major portion of the sensor 126 except for the pole of the magnet 131 which is juxtaposed to the armature shaft 124 and the end portion 128 of the core 127. Such a protective covering is also embodied in conjunction with the embodiments of FIGS. 8, 9; 10, 11 and 12, 13. In conjunction with these embodiments, the protective covering has been eliminated from the illustration so as to more clearly show the construction.

As with the preceding embodiments, as the armature 124 rotates a varying magnetic flux will pass through the core 127 which reaches its maximum when the armature end 128 is juxtaposed to one of the teeth 123 and its minimum when the rotor 122 is in the position shown in FIG. 15. This varying magnetic flux will induce a voltage in the coil 132 which is directly related to engine speed.

It should be readily apparent that the construction of each of the described embodiments provides a highly effective tachometer generator that will have a high signal to noise ratio. Different numbers of teeth on the rotors have been illustrated in certain of the embodiments from the others, but it to be understood that the selection of the number of teeth may depend upon the specific application. In each embodiment, however, the device uses only a single permanent magnet with has its poles aligned and which is not subjected to the fields of other magnets which may cause general demagnetization of the complete device. Although certain of the embodiments have been found to give greater signal to noise ratio than others, for instance the embodiment of FIGS. 1 through 7 have been found to give the best results, the various other constructions may offer some advantages as to specific installations. In each embodiment, however, the close proximity of the magnet to the teeth of the rotor and the compactness of the design not only gives a high output signal but lends the device to installations where there is little space. Various changes and modifications may be made without departing from the spirit and scope of the invention, as defined by the appended claims.

We claim:

1. A portable power tool, comprising:
an electric motor having a rotatable armature shaft extending axially;
speed control means for adjusting the speed of said motor;
a tachometric generator for supplying an electrical signal to said speed control means indicative of the actual rotational speed of said motor, and comprising a toothed rotor with radially outwardly extending teeth and a sensor;
said rotor being of magnetically permeable material and being mounted on one end of said armature shaft for rotation therewith;
said sensor having a single magnet, a core member having a first end portion, an intermediate portion, and a second end portion which has said magnet mounted thereon, and a coil disposed about said intermediate portion and electrically connected to said speed control means;
said second end portion extending radially outwardly and being disposed in axial alignment with said teeth during rotation thereof;
said magnet having axially aligned poles and being directly interposed between said rotor and said second end portion at a first location in close proximity to said teeth during rotation thereof;
said first end portion extending in an axial direction relative to said armature shaft and being disposed radially outwardly and adjacent the teeth of said toothed rotor at a second location spaced from said first location; and
said entire sensor being encased in a protective covering of plastic except for the pole of said magnet adjacent said teeth and said first end portion;
whereby a series magnetic circuit is formed comprising said toothed rotor, said core member and said magnet, and said coil is responsive to changes in the intensity of flux passing through said magnetic circuit as said rotor rotates, said tachometric generator being compact and exhibiting a high signal to noise ratio.

2. A portable power tool, comprising:
an electric motor having a rotatable armature shaft;
a tachometric generator for use in controlling the speed of said motor, and comprising a rotor fixed for rotation with said armature shaft and a sensor justaposed to said rotor;
said rotor having radially outwardly extending teeth and being made of magnetically permeable material;
said sensor having a core, a single permeanent magnet and a coil;
said core having a first end portion juxtaposed to said rotor at a first location, a second end portion juxtaposed to said rotor at a second, spaced location, and an intermediate portion connecting said first and second end portions;
said magnet being directly interposed between said second end portion and said rotor with one of the poles of said magnet aligned with said second end portion and the ohter of its poles aligned with and in close proximity to said rotor teeth during rotation thereof;
said coil being wound around said intermediate portion with said first end portion extending beyond said coil; and
said first end portion extending over said rotor in a direction parallel to the axis of rotation of said rotor;
whereby alternating magnetic flux passing through said core during rotation of said rotor generates a voltage signal from said coil which is indicative of the speed of said motor and which exhibits a high signal to noise ratio due to there being only a single magnet and its close proximity to said rotor.

3. A portable power tool, comprising:
an electric motor having a rotatable armature shaft;
a tachometric generator for supplying an electrical signal indicative of the speed of said motor, and comprising a rotor mounted for rotation with said armature shaft and a sensor juxtaposed to said rotor;
said rotor having radially outwardly extending teeth and being made of magnetically permeable material;
said sensor comprising a core, a single permanent magnet and a coil;
a first end portion of said core extending over the top of said teeth in a direction parallel to the axis of rotation of said rotor and being adjacent said teeth as said teeth pass thereby during rotation of said rotor, said first end portion having a width approximately equal to the width of said teeth;
a second end portion of said core extending radially outwardly with respect to said rotor at a location axially spaced from but adjacent said rotor;
said core having an intermediate portion connecting said first and second end portions;
said magnet being mounted on said second end portion and being directly interposed between said second end portion and said rotor with the poles of said magnet aligned in a direction parallel to and spaced from said axis of rotation and in alignment with said teeth as said teeth pass thereby during rotation of said rotor; and
said coil being wound around said intermediate portion with said first end portion extending beyond said coil;
whereby a series magnetic circuit is formed by said rotor, said core and said magnet, and said coil is responsive to changes in the intensity of flux passing through said magnetic circuit as the rotor rotates.

4. A portable power tool as set forth in claim 3, wherein said intermediate portion comprises a leg having a generally L-shaped.

5. A portable power tool as set forth in claim 4, wherein said intermediate portion further comprises another leg portion extending axially between said first end portion and said L-shape leg, said coil being wound around said another leg portion.

6. A portable power tool as set forth in claim 4, wherein said rotor has four teeth.

7. A portable power tool as set forth in claim 3, wherein said sensor is encased in a protective covering except for one of the poles of said magnet and said first end portion.

* * * * *